US012644219B2

(12) United States Patent
Attar et al.

(10) Patent No.: US 12,644,219 B2
(45) Date of Patent: Jun. 2, 2026

(54) IMPELLER FOR LAUNDRY APPLIANCE THAT INCORPORATES A FILTERING CAP FOR SEPARATING PARTICULATE MATTER FROM WASH FLUID WITHIN THE APPLIANCE

(71) Applicant: WHIRLPOOL CORPORATION, Benton Harbor, MI (US)

(72) Inventors: Mohsin M. Attar, Pune (IN); Anayancy Campos, Nuevo León (MX); Aliander F. Silva, São Paulo (BR); Eric J. Vasko, St. Joseph, MI (US); Sayer J. Murphy, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 271 days.

(21) Appl. No.: 18/325,400

(22) Filed: May 30, 2023

(65) Prior Publication Data

US 2023/0399788 A1 Dec. 14, 2023

Related U.S. Application Data

(60) Provisional application No. 63/350,959, filed on Jun. 10, 2022.

(51) Int. Cl.
| | |
|---|---|
| *D06F 39/10* | (2006.01) |
| *B01D 29/35* | (2006.01) |
| *B01D 29/90* | (2006.01) |
| *B01D 35/30* | (2006.01) |
| *D06F 17/06* | (2006.01) |
| *D06F 17/10* | (2006.01) |
| *D06F 23/04* | (2006.01) |
| *D06F 37/14* | (2006.01) |

(52) U.S. Cl.
CPC ............ *D06F 39/10* (2013.01); *B01D 29/35* (2013.01); *B01D 29/902* (2013.01); *B01D 35/30* (2013.01);
(Continued)

(58) Field of Classification Search
CPC .......... D06F 39/10; D06F 17/06; D06F 17/10; D06F 23/04; D06F 37/145; B01D 29/35;
(Continued)

(56) References Cited

U.S. PATENT DOCUMENTS

| | | | | | |
|---|---|---|---|---|---|
| 2,942,444 | A | * | 6/1960 | Abresch | D06F 39/10 |
| | | | | | 68/17 A |
| 2,976,711 | A | * | 3/1961 | Smith | D06F 39/024 |
| | | | | | 68/53 |

(Continued)

FOREIGN PATENT DOCUMENTS

| | | | | | |
|---|---|---|---|---|---|
| CN | 105155193 A | * | 12/2015 | ............ | D06F 17/10 |
| JP | 3817502 B2 | | 9/2006 | | |

(Continued)

OTHER PUBLICATIONS

Machine translation of CN-105155193-A to Jiang et al. (Year: 2015).*

(Continued)

*Primary Examiner* — Joseph L. Perrin
(74) *Attorney, Agent, or Firm* — Price Heneveld LLP

(57) ABSTRACT

A washing appliance includes a drum that is rotationally operable within the tub about a vertical rotational axis. An impeller is positioned within a lower portion of the drum and is rotationally operable about the vertical rotational axis. The impeller includes a plurality of external vanes and a plurality of channel ribs that cooperate to promote a toroidal flow of wash fluid within the drum. A filtering cap is disposed on a top portion of the impeller and has a plurality of inlets that direct the toroidal flow of the wash fluid into a filtering chamber positioned within the filtering cap. The toroidal flow of the wash fluid continues through the filtering cham- (Continued)

ber and beneath an underside of the impeller, wherein the filtering chamber separates particulate matter from the toroidal flow of the wash fluid.

20 Claims, 9 Drawing Sheets

(52) U.S. Cl.
CPC .............. *D06F 17/06* (2013.01); *D06F 17/10* (2013.01); *D06F 23/04* (2013.01); *D06F 37/145* (2013.01); *B01D 2201/302* (2013.01); *B01D 2201/325* (2013.01)

(58) Field of Classification Search
CPC ............................. B01D 29/902; B01D 35/30; B01D 2201/302; B01D 2201/325
See application file for complete search history.

(56) References Cited

U.S. PATENT DOCUMENTS

| | | | |
|---|---|---|---|
| 3,314,253 A | 4/1967 | Smith | |
| 4,338,802 A | 7/1982 | Ohmann et al. | |
| 7,392,672 B2 | 7/2008 | Kim et al. | |
| 7,827,830 B2 | 11/2010 | Kim | |
| 7,836,733 B2 | 11/2010 | Bae et al. | |
| 10,253,446 B2 | 4/2019 | Lv et al. | |
| 10,920,359 B2 | 2/2021 | Piekarski et al. | |
| 11,149,377 B2 | 10/2021 | Lee et al. | |
| 11,414,802 B2 | 8/2022 | Lee et al. | |
| 2013/0319056 A1* | 12/2013 | Lee .......................... | D06F 17/10 68/132 |
| 2015/0033803 A1* | 2/2015 | Carr ........................ | D06F 13/00 68/133 |
| 2018/0313024 A1* | 11/2018 | Piekarski .............. | D06F 39/088 |
| 2020/0248364 A1 | 8/2020 | Lee et al. | |

FOREIGN PATENT DOCUMENTS

| | | | | |
|---|---|---|---|---|
| KR | 100335053 B1 | 5/2002 | | |
| KR | 20160126444 A * | 11/2016 | ............. | D06F 39/10 |
| WO | 2005118940 A1 | 12/2005 | | |
| WO | 2015139476 A1 | 9/2015 | | |
| WO | 2017119641 A1 | 7/2017 | | |

OTHER PUBLICATIONS

Machine translation of KR-20160126444-A to Park et al. (Year: 2016).*

* cited by examiner

IMPELLER FOR LAUNDRY APPLIANCE THAT INCORPORATES A FILTERING CAP FOR SEPARATING PARTICULATE MATTER FROM WASH FLUID WITHIN THE APPLIANCE

CROSS-REFERENCE TO RELATED APPLICATION

This application claims priority to and the benefit under 35 U.S.C. § 119(e) of U.S. Provisional Patent Application No. 63/350,959, filed on Jun. 10, 2022, entitled IMPELLER FOR LAUNDRY APPLIANCE THAT INCORPORATES A FILTERING CAP FOR SEPARATING PARTICULATE MATTER FROM WASH FLUID WITHIN THE APPLIANCE, the entire disclosure of which is hereby incorporated herein by reference.

BACKGROUND OF THE DISCLOSURE

The present disclosure generally relates to laundry appliances, and more specifically, to a laundry appliance having an impeller within a rotating drum, where the impeller includes a filtering cap with one or more filtration mechanisms that separate particulate matter, such as pet hair, from wash water that is used for treating laundry within the rotating drum.

SUMMARY OF THE DISCLOSURE

According to an aspect of the present disclosure, a washing appliance includes a tub that is positioned within an outer cabinet, a drum that is rotationally operable within the tub about a vertical rotational axis, and an impeller that is positioned within a lower portion of the drum and is rotationally operable relative to the drum about the vertical rotational axis. The impeller includes a plurality of external vanes. A plurality of structural ribs are disposed on an underside of the impeller. The plurality of external vanes and the plurality of structural ribs cooperate to promote a toroidal flow of wash fluid within the drum. A filtering cap is disposed on a top portion of the impeller. The filtering cap has a plurality of inlets that direct the toroidal flow of the wash fluid into a filtering chamber that is positioned within the filtering cap. The toroidal flow of the wash fluid continues through the filtering chamber and beneath an underside of the impeller. The filtering chamber is configured to separate particulate matter from the toroidal flow of the wash fluid.

According to another aspect of the present disclosure, an impeller for a top-load washing appliance includes a plurality of external vanes that extend outward from a central receiver to an outer edge. A plurality of lowered portions are positioned in an alternating configuration between the plurality of external vanes. A plurality of channel ribs are disposed on an underside of the impeller and within the plurality of external vanes. A filtering cap is disposed within the central receiver. The filtering cap has a plurality of inlets that are configured to direct a toroidal flow of wash fluid into a filtering chamber that is positioned within the filtering cap. The filtering cap is selectively removable from the central receiver. A plurality of flow channels are defined, respectively, by an underside of the plurality of external vanes. The plurality of flow channels extend from the filtering chamber to the outer edge.

According to another aspect of the present disclosure, an impeller for a top-load washing appliance includes a plurality of external vanes that extend outward from a central receiver to an outer edge. A plurality of lowered portions are positioned in an alternating configuration between the plurality of external vanes. A plurality of channel ribs are disposed on an underside of the impeller and within the plurality of external vanes. A filtering cap is disposed within the central receiver. The filtering cap has a cap portion defining a plurality of inlets and a particulate filter that is selectively attached to the cap portion. A filter screen is attached to the particulate filter of the filtering cap. The plurality of inlets are configured to direct a toroidal flow of wash fluid into a filtering chamber that is positioned between the filtering cap and the central receiver. The filtering cap is selectively removable from the central receiver. A plurality of flow channels are defined, respectively, by an underside of the plurality of external vanes. The plurality of flow channels extend from the filtering chamber to the outer edge.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 10 is a cross-sectional perspective view of an aspect of the filtering cap and showing a unitary construction of the filtering cap; and FIG. 11 is a top perspective view of the filtering cap of FIG. 10.

Figure 1:
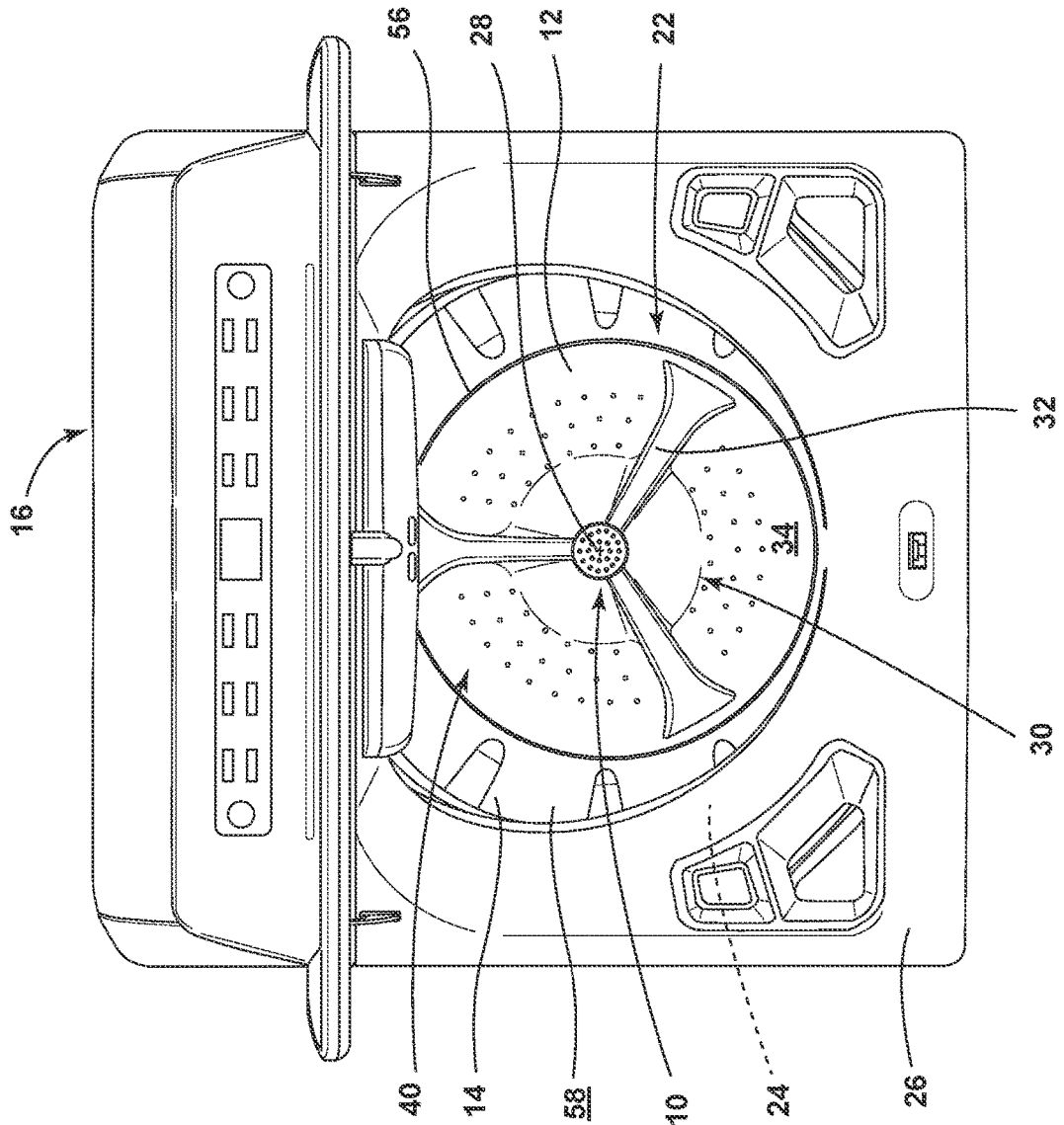
FIG. 1 is a top perspective view of a vertical-axis laundry appliance having an impeller that incorporates an aspect of the filtering cap.
Figure 2:
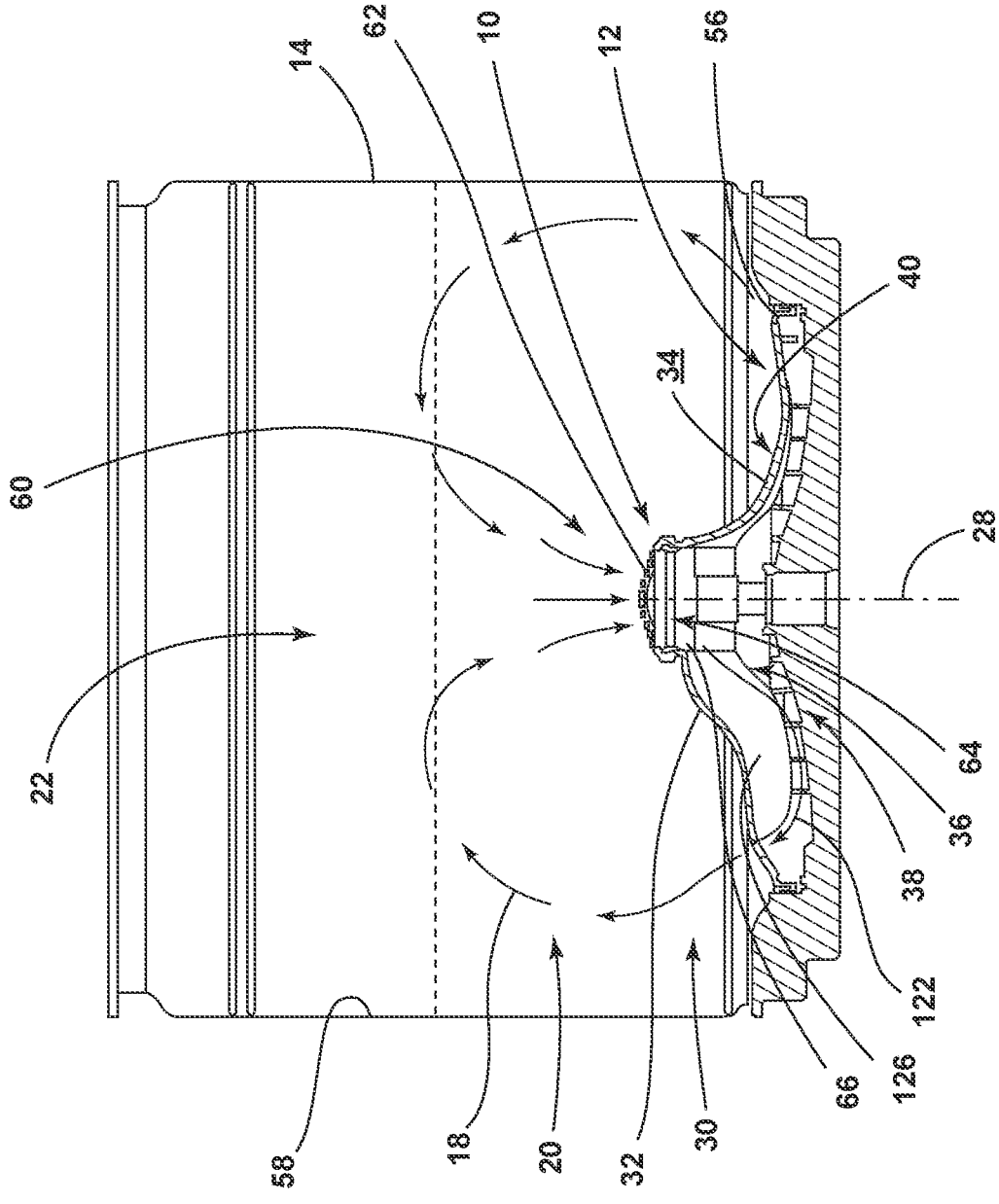
FIG. 2 is a schematic cross-sectional view of a rotating drum having an impeller that incorporates an aspect of the filtering cap.
Figures 3, 4:
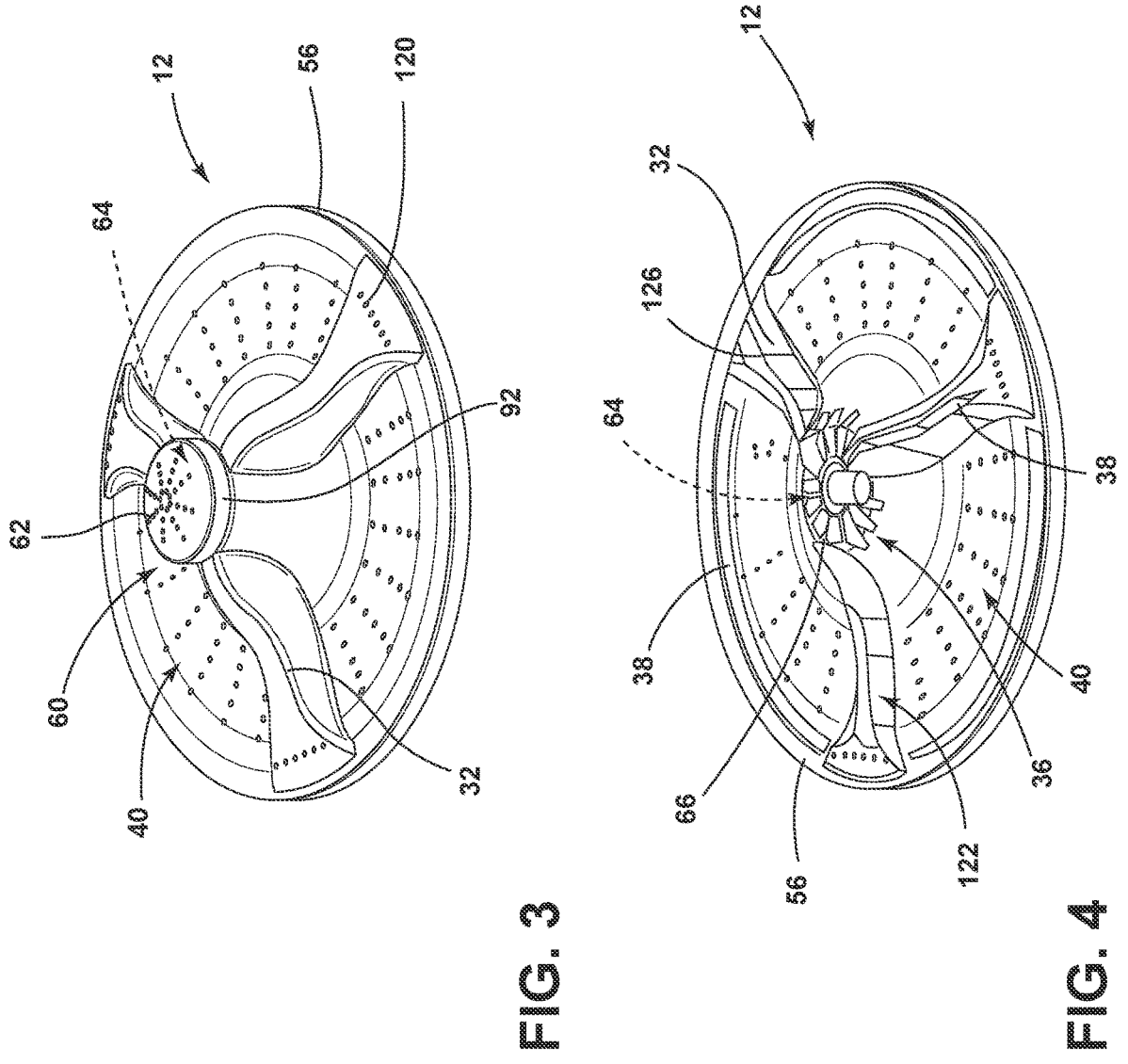
FIG. 3 is a top perspective view of an impeller that incorporates an aspect of the filtering cap.
FIG. 4 is a bottom perspective view of the impeller of FIG. 3.

The components in the figures are not necessarily to scale, emphasis instead being placed upon illustrating the principles described herein.

DETAILED DESCRIPTION

The present illustrated embodiments reside primarily in combinations of method steps and apparatus components related to a filtering cap for an impeller of a vertical axis washing appliance that directs a toroidal flow of wash fluid through the filtering cap to separate out pet hair and other fine particulate matter from the wash fluid. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-11, reference numeral 10 generally refers to a filtering cap that is incorporated within an impeller 12 that rotationally operates within a drum 14 for a laundry appliance 16. Typically, the impeller 12 and the drum 14 can rotate together or independently for generating a toroidal flow 18 of wash fluid through a processing space 22 defined within the drum 14, typically above the impeller 12. This toroidal flow 18 moves through the filtering cap 10 for allowing the filtering cap 10 to separate out particulate matter, such as pet hair from the wash fluid 20 moving through the drum 14. The drum 14 also rotates within a tub 24 that is positioned within an outer cabinet 26. According to various aspects of the device, the appliance 16, typically in the form of a vertical axis washing appliance, or top-load washing appliance, includes the tub 24 that is positioned within the outer cabinet 26. The drum 14 is rotationally operable within the tub 24 about the vertical rotational axis 28. The impeller 12 is positioned within a lower portion 30 of the drum 14 and is rotationally operable relative to the drum 14 and about the vertical rotational axis 28.

The impeller 12 includes a plurality of external vanes 32 that are positioned to extend upward from a top surface 34 of the impeller 12. A plurality of structural ribs 36 are disposed on an underside 38 of the impeller 12. The external vanes 32 in the plurality of structural ribs 36 cooperate to promote the toroidal flow 18 of wash fluid 20 within the drum 14. The toroidal flow 18 extends from the underside 38 of the impeller 12, around an outer edge 56 of the impeller 12. This toroidal flow 18 continues upward near an outer surface 58 of the rotating drum 14 and then back inward toward a central location proximate the rotational axis 28 of the drum 14 so that the wash fluid 20 can be moved through the filtering cap 10 of the impeller 12 to repeat this toroidal flow 18 through the processing space 22 of the drum 14. The filtering cap 10 is disposed on a top portion 60 of the impeller 12 where the filtering cap 10 includes a plurality of inlets 62 that direct the toroidal flow 18 of wash fluid 20 into a removable particulate filtering chamber 64 that is positioned within the filtering cap 10. The toroidal flow 18 is further directed through a plurality of flow apertures 66 that extend through the underside 38 of the impeller 12 and within the external vanes 32 to continue the toroidal flow 18 of wash fluid 20 within the drum 14.

Figure 5:
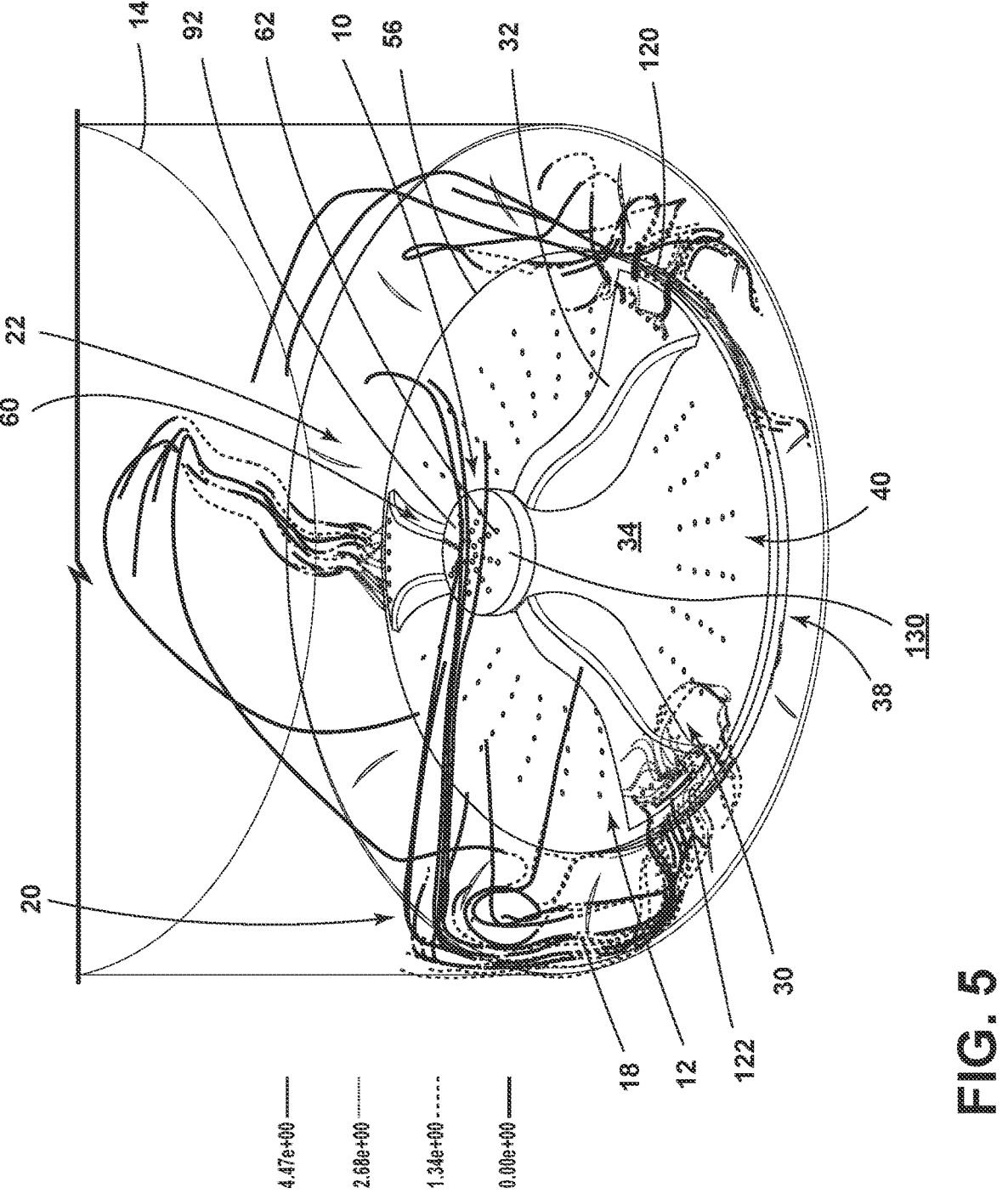
FIG. 5 is a schematic perspective view of an impeller having an aspect of the filtering cap and showing a toroidal flow of wash fluid within a rotating drum.
Figure 6:
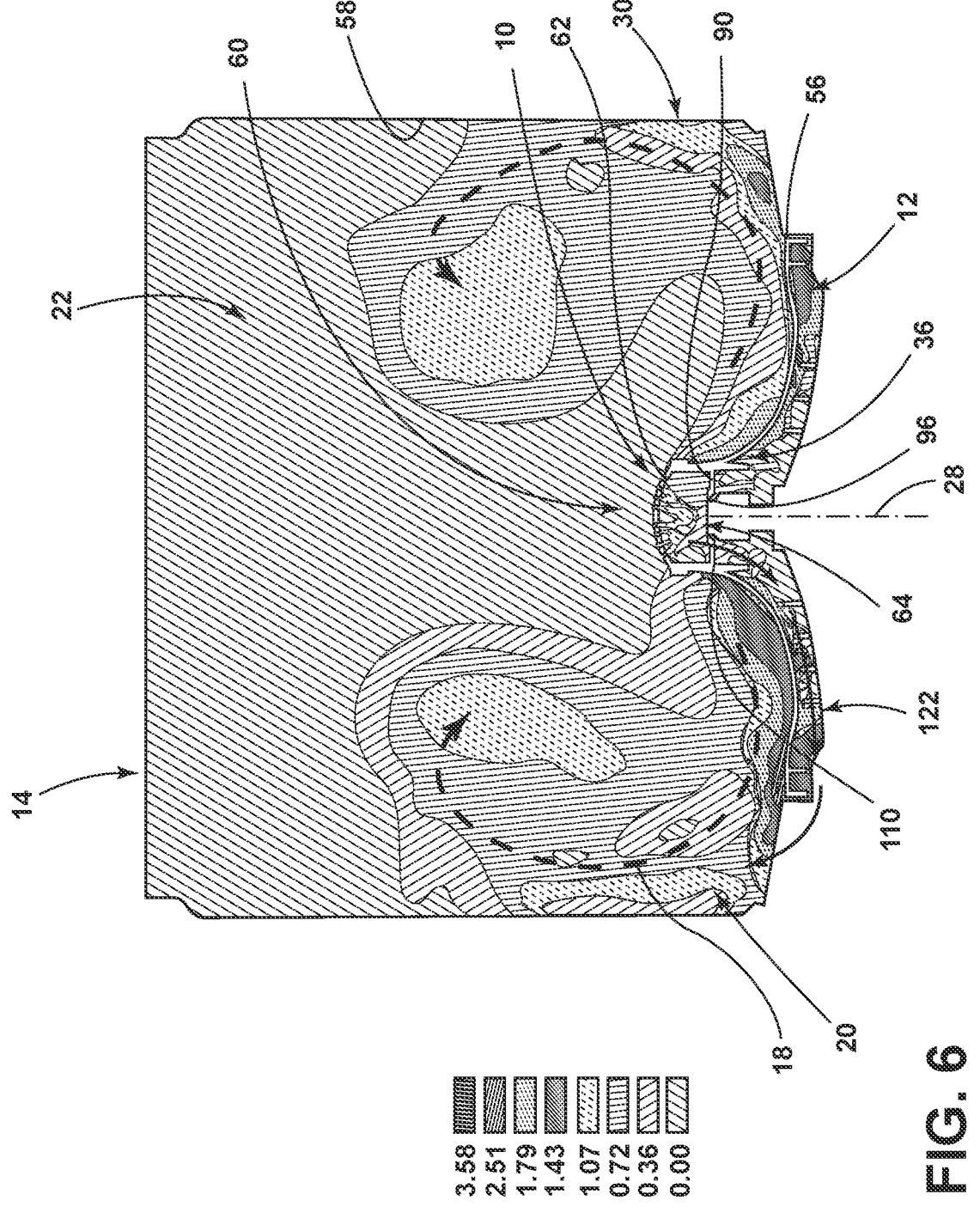
FIG. 6 is a schematic cross-sectional view of a rotating drum for an appliance having an aspect of the filtering cap installed on an impeller and showing a toroidal flow of wash fluid within the drum.

As illustrated in FIGS. 5 and 6, shown as an exemplary configuration of the impeller 12 and the filtering cap 10 set within the drum 14, operation of the impeller 12 relative to the drum 14 generates an outward motion of the wash fluid 20 beneath the impeller 12 and toward an outer edge of the impeller 12. As discussed herein, the motion of the structural ribs 36 and the external vanes 32 through the wash fluid 20 contained in the drum 14 generates this outward flow of the wash fluid 20. This motion of the wash fluid 20, in turn, results in a suction-type effect that draws the wash fluid 20 from above the impeller 12, to be directed into and through the particulate filtering chamber 64. The combination of these flows of wash fluid 20 results in the toroidal flow 18 of the wash fluid 20 around and through the impeller 12 and through the processing space 22 of the drum 14.

Referring again to FIGS. 1-6, the impeller 12 for the laundry appliance 16 is positioned within a lower portion 30 of the drum 14. The impeller 12 and the drum 14 can rotate together and in unison or can rotate independently of one another. In certain aspects, the impeller 12 can rotate in the opposite direction of the drum 14 as well as at different rotational speeds. Rotation of the impeller 12 relative to the drum 14 helps to generate the toroidal flow 18 of wash fluid 20 that circulates the wash fluid 20 within the processing space 22. In certain aspects of the device, the plurality of structural ribs 36 can be incorporated within an underside 38 of the impeller 12 to assist in defining the plurality of external vanes 32 that project upward from the top surface 34 of the impeller 12. Through this configuration, the flow apertures 66 can extend from the removable particulate filtering chamber 64 positioned within the filtering cap 10 to an outer edge 56 of the impeller 12 for directing the wash fluid 20 in the generally toroidal flow 18. Typically, the plurality of external vanes 32 and a plurality of lowered portions 40 are positioned in an alternating configuration. In this manner, the lowered portions 40 are positioned, respectively, between adjacent external vanes 32. Additionally, it is typical that the structural ribs 36 are located within the underside 38 of the impeller 12 and within at least one of the external vanes 32 or the lowered portions 40. In this manner, where the structural ribs 36 are located within the lowered portions 40, the flow paths 122 extend under the external vanes 32 and between sections of the structural ribs 36. At least a portion of the structural ribs 36 can be included within the flow paths 122. These structural ribs 36 can be in the form of channel ribs 126 that are located within the flow channels 122 of the external vanes 32. These channel ribs 126 are oriented to radiate outward along the direction of motion of the wash fluid 20 through the toroidal flow 18. These channel ribs 126 within the external vanes 32 are positioned to extend along the flow paths 122 and assist directing the wash fluid 20 through the flow paths 122 and through the toroidal flow 18.

Referring now to FIGS. 2-11, the filtering cap 10 can include a removable particulate filter 90 that is positioned under the plurality of inlets 62 of the filtering cap 10. In certain aspects of the device, the filtering cap 10 can include a multi-piece construction that includes the cap portion 92 that is attached to the removable particulate filter 90 positioned below the cap portion 92. The removable particulate filter 90 can include various laterally-oriented apertures 94 that allow for movement of wash fluid 20 from the particulate filtering chamber 64 and through the flow apertures 66 of the impeller 12. These laterally-oriented apertures 94 are positioned to be generally perpendicular to the plurality of inlets 62 of the cap portion 90. In this manner, the inlets 62 direct the toroidal flow 18 of wash fluid 20 in a generally downward direction and into the particulate filtering chamber 64. The laterally-oriented apertures 94 assist in redirecting the toroidal flow 18 of wash fluid 20 in a generally lateral direction, through the flow apertures 66 and the flow paths 122. As the wash fluid 20 moves in this pattern, one or more filter screens 96, such as a perforated member, a mesh member, or other similar filter screen 96 can be used for capturing fine particulate matter that is moving through the particulate filtering chamber 64 of the filtering cap 10 and the impeller 12. The positioning of the particulate filter 90 of the filtering cap 10 is typically in engagement with the flow apertures 66. This interaction promotes the movement of all or substantially all of the wash fluid 20 through the filter screen 96 for capturing the particulate matter within the particulate filtering chamber 64.

As exemplified in FIGS. 2-11, the impeller 12 can include a receiver 110 that is defined within a top surface 34 of the impeller 12. This receiver 110 can at least partially define a portion of the particulate filtering chamber 64, where the remainder of the particulate filtering chamber 64 is defined by the filtering cap 10, which is selectively received within the receiver 110. The receiver 110 of the impeller 12 also defines the flow apertures 66 that allows for the movement of wash fluid 20 from the particulate filtering chamber 64 and to the underside 38 of the impeller 12. Accordingly, the external vanes 32, which define the flow apertures 66 and the flow paths 122, extend outward from the centrally-located receiver 110. Additionally, the filter screen 96 that is positioned within the particulate filter 90 of the filtering cap 10 can extend over the receiver 110 to ensure that all of the wash fluid 20 that moves through the particulate filtering chamber 64 is filtered to separate out fine particulate matter.

Referring again to FIGS. 1-6, the impeller 12 can include various flow outlets 120 that are positioned near the outer edge 56 of the impeller 12. These flow outlets 120 assist in moving the wash fluid 20 from the underside 38 of the impeller 12 and within the flow paths 122, defined within channels that are formed by the underside 38 of the external vanes 32, and to the outer edge 56 of the impeller 12 to promote the toroidal flow 18. Accordingly, the impeller 12 includes a plurality of flow paths 122 that extend from the particulate filtering chamber 64, through the flow apertures 66 and to an outer edge 56 of the impeller 12. In this manner, the flow apertures 66 place the particulate filtering chamber 64 in communication with the flow paths 122, respectively. Accordingly, each of the flow apertures 66 is aligned with a respective flow path 122. Additionally, each external vane 32 of the impeller 12 corresponds to a flow aperture 66 and flow path 122 pair that extends from the particulate filtering chamber 64 and to the outer edge 56 of the impeller 12. This communication allows for the toroidal flow 18 of the wash fluid 20 to move through and around the impeller 12. It is contemplated that the structural ribs 36 can be aligned with the flow paths 122 and the external vanes 32 to further promote this flow of wash fluid 20 from the particulate filtering chamber 64 and to the outer edge 56 of the impeller 12, via at least a portion of the flow paths 122.

Referring now to FIGS. 7-11, the filtering cap 10 can include various inlets 62 that are positioned an upper surface 130 of the cap portion 92 of the filtering cap 10. These inlets 62 allow for the movement of wash fluid 20 into the particulate filtering chamber 64. Additionally, these inlets 62 are sized to allow for the movement of wash fluid 20 into the particulate filtering chamber 64 but also preventing clothing from entering into the particulate filtering chamber 64 or otherwise blocking the movement of wash fluid 20 into the particulate filtering chamber 64. The inlets 62 of the cap portion 92 can include various shapes and sizes. These shapes and sizes can include, but are not limited to, slots, perforations, circular or polygonal openings, combinations thereof, and other similar shapes and configurations. The filtering cap 10 is positioned within the receiver 110 of the impeller 12 and within a lower portion 30 of the drum 14 such that clothing, when being processed, is typically positioned on top of the impeller 12. Accordingly, use of the filtering cap 10 allows for the movement of wash fluid 20 without allowing the articles being processed from interfering with this motion of wash fluid 20 through the toroidal flow 18 and within the drum 14.

During operation of the appliance 16, clothing may rest upon the upper surface 130 of the filtering cap 10. The inlets 62 allow for the movement of wash fluid 20 through and between the articles so that processing of the articles can continue as the wash fluid 20 moves through the processing space 22 defined by the drum 14. Additionally, because the inlets 62 of the cap portion 92 of the filtering cap 10 prevent clothing from entering into the particulate filtering chamber 64, particulate matter is also allowed to move off from and around the clothing to be captured within the particulate filtering chamber 64 and the filter member of the filtering cap 10.

According to the various aspects of the device, the filtering cap 10 is positioned in the lower portion 30 of the drum 14. In this position, the filtering cap 10 can be completely submerged in wash fluid 20 during processing of relatively small amounts of articles. This allows the drum 14 and the impeller 12 to create the toroidal flow 18 of wash fluid 20 in relatively small amounts of wash fluid 20. Accordingly, the filtering cap 10 can be used to separate particulate matter in a wide range of laundry load sizes.

Figure 7:
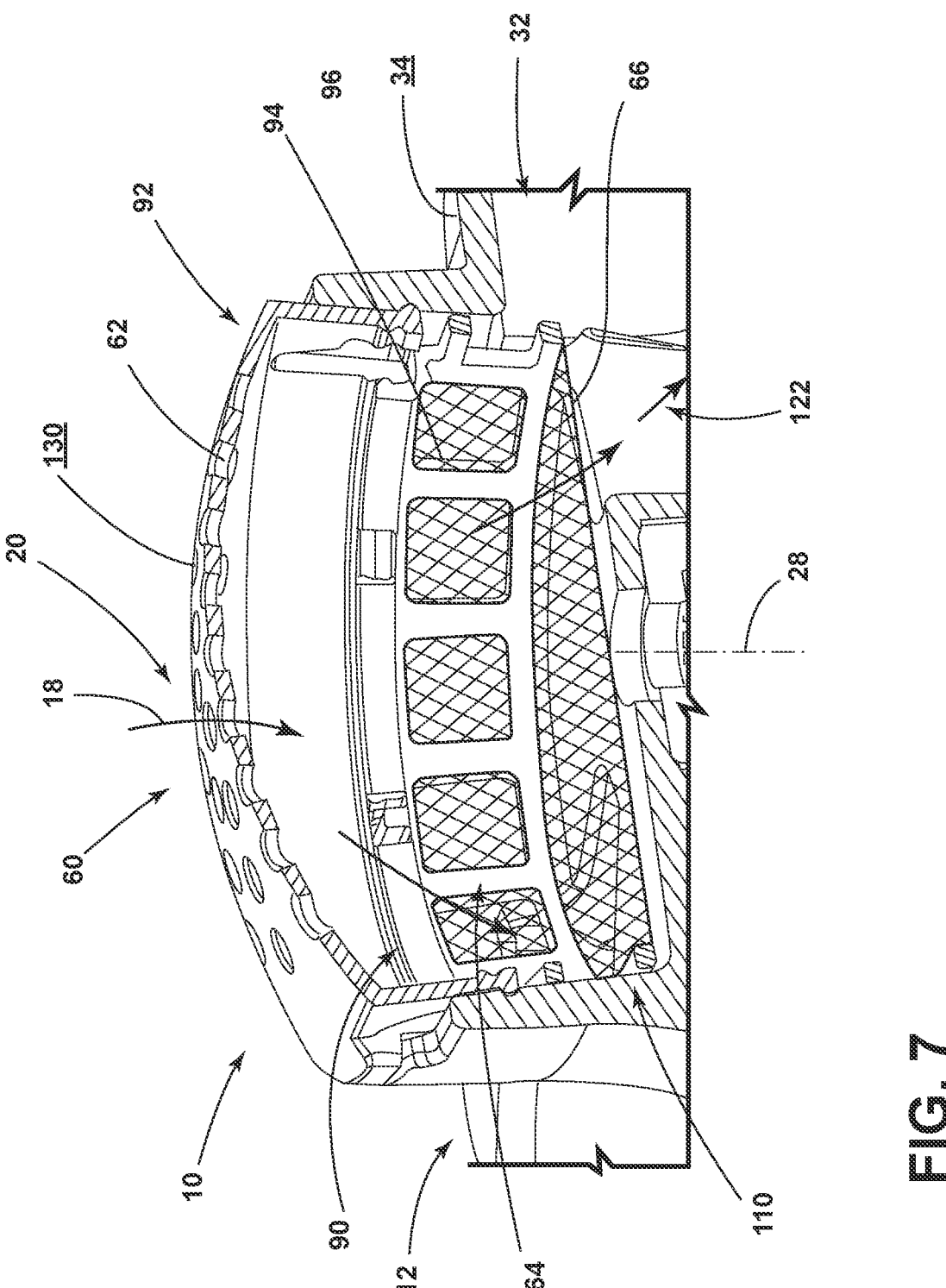
FIG. 7 is a cross-sectional perspective view of an aspect of the filtering cap installed on the impeller.
Figure 8:
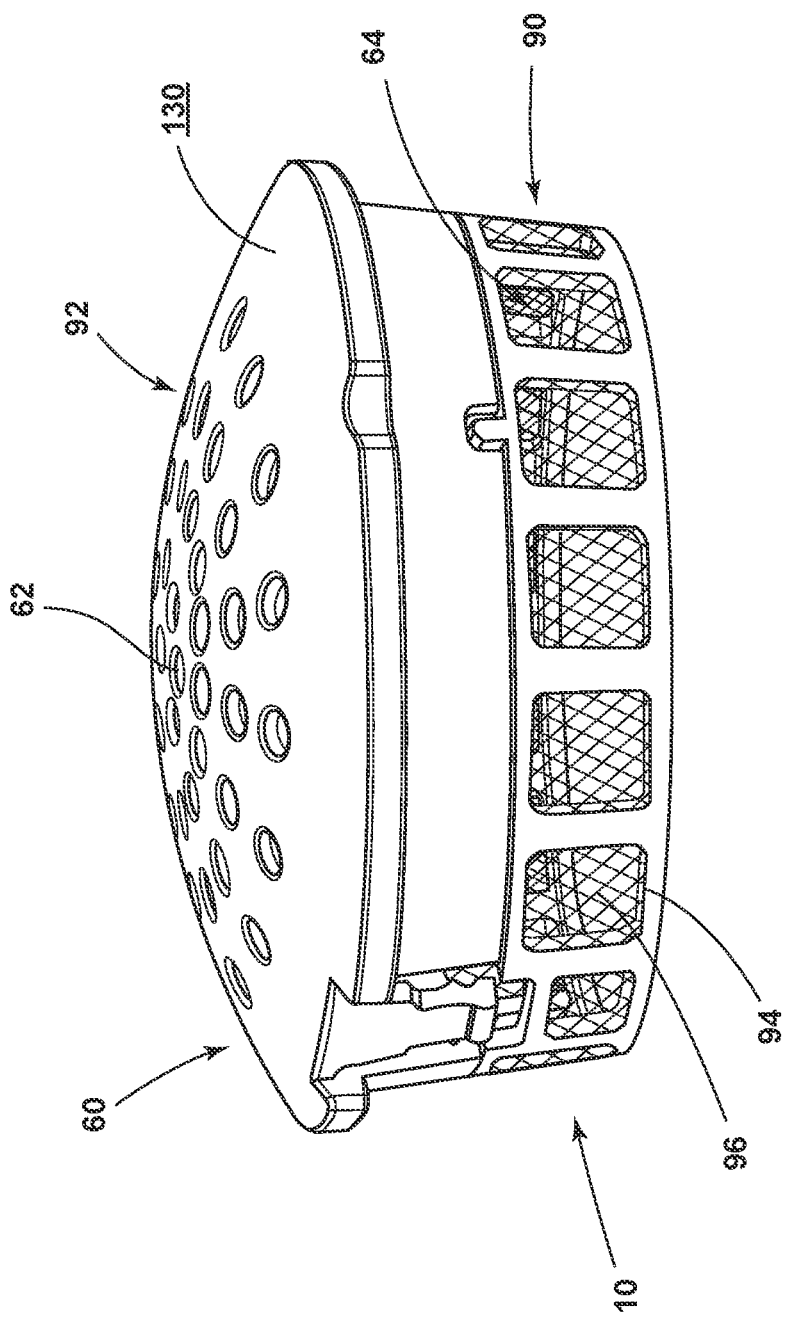
FIG. 8 is a perspective view of the filtering cap of FIG. 7.
Figure 9:
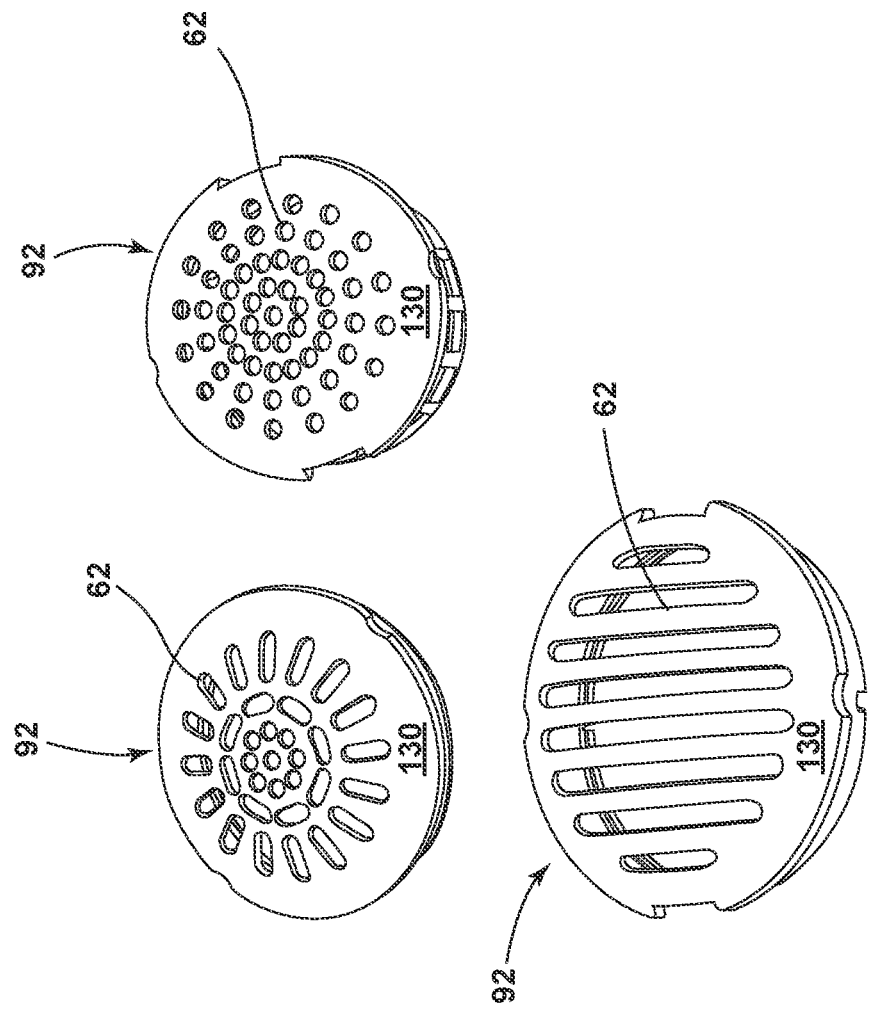
FIG. 9 is a series of top perspective views of configurations of the inlets positioned on a cap portion of the filtering cap.

Referring now to FIGS. 7-9, the cap portion 92 of the filtering cap 10 can be attached to the particulate filter 90 of the filtering cap 10. This selective engagement, and selective disengagement, can be accomplished through a twist-lock configuration, a snapping configuration or other similar separable configuration. It is also contemplated that the cap portion 92 can be fixedly attached to the particulate filter 90 through fasteners, welding, adhesives, or other similar fastening mechanism or method. Typically, the particulate filter 90 will be selectively separable from the cap portion 92 to allow for the user to access the filter screen 96 and remove particulate matter from the filtering cap 10. It is contemplated that the user can access and clean out the filtering cap 10 periodically. In certain aspects, the filtering cap 10 is intended to be cleaned after every wash cycle. In other aspects of the device, the filtering cap 10 can be cleaned after a number of wash cycles, such as daily, weekly, or other similar timeframe.

Figures 10, 11:
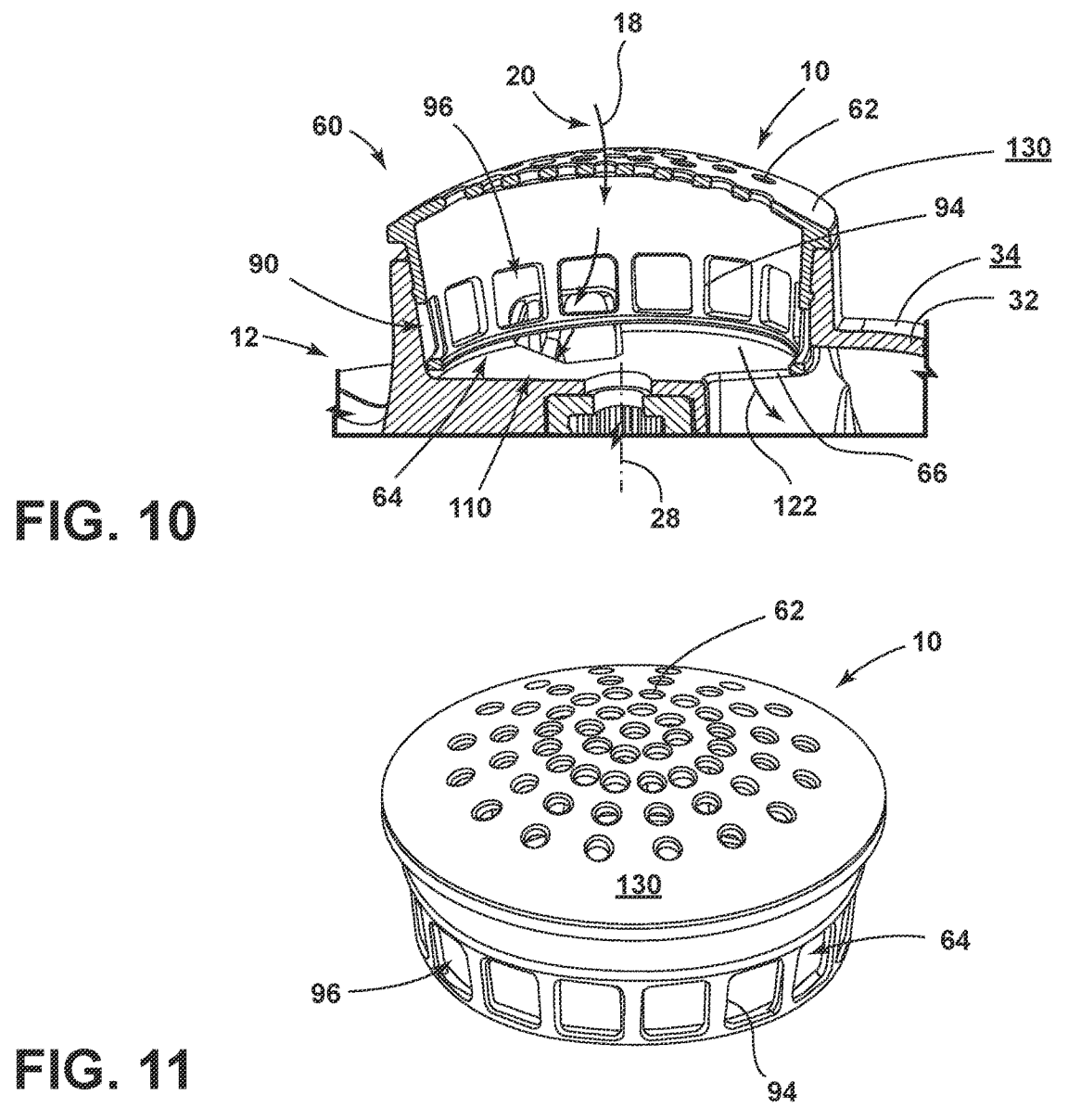

As exemplified in FIGS. 10 and 11, the filtering cap 10 can be a unitary member. In such an aspect of the device, the filter screen 96 can be removed from the filtering cap 10 for cleaning. In addition, it is contemplated that the filter screen 96 can be contained within the particulate filtering chamber 64 between the receiver 110 and the remainder of the filtering cap 10. Accordingly, the filtering cap 10, in the various aspects of the device, can be attached to the receiver 110 via various interference connections that can include a twist-lock connection, a snapping engagement or other similar separable engagement.

The invention disclosed herein is further summarized in the following paragraphs and is further characterized by combinations of any and all of the various aspects described therein.

According to an aspect of the present disclosure, a washing appliance includes a tub that is positioned within an outer cabinet, a drum that is rotationally operable within the tub about a vertical rotational axis, and an impeller that is positioned within a lower portion of the drum and is rotationally operable relative to the drum about the vertical rotational axis. The impeller includes a plurality of external vanes. A plurality of structural ribs are disposed on an underside of the impeller. The plurality of external vanes and the plurality of structural ribs cooperate to promote a toroidal flow of wash fluid within the drum. A filtering cap is disposed on a top portion of the impeller. The filtering cap has a plurality of inlets that direct the toroidal flow of the wash fluid into a filtering chamber that is positioned within the filtering cap. The toroidal flow of the wash fluid continues through the filtering chamber and beneath an underside of the impeller. The filtering chamber is configured to separate particulate matter from the toroidal flow of the wash fluid.

According to another aspect, the filtering chamber is in communication with flow apertures that extend through the impeller and beneath the plurality of external vanes, respectively.

According to another aspect, the underside of the impeller beneath the plurality of external vanes defines respective flow paths that extend from the flow apertures and to an outer edge of the impeller. The flow paths at least partially define the toroidal flow of the wash fluid during operation of the impeller during a wash cycle.

According to another aspect, the top of the impeller includes a receiver that receives the filtering cap. The filtering cap is selectively removable from the receiver.

According to another aspect, the receiver and the filtering cap cooperate to define the filtering chamber.

According to another aspect, the receiver includes a filter screen that extends over the flow apertures of the receiver to separate the particulate matter from the toroidal flow of the wash fluid.

According to another aspect, the filtering cap is selectively removable from the receiver to provide selective access to the filtering chamber.

According to another aspect, the plurality of external vanes define a plurality of flow outlets that provide flow communication between the respective flow paths and a processing space of the drum above the impeller.

According to another aspect, the plurality of channel ribs are aligned with the flow paths and the plurality of external vanes that define the flow paths.

According to another aspect, the plurality of inlets of the filtering cap includes at least one of slots and perforations that are defined within a cap portion of the filtering cap.

According to another aspect, the filtering cap includes a cap portion and a particulate filter that has laterally-oriented apertures that are oriented generally perpendicular to the plurality of inlets.

According to another aspect, the cap portion and the particulate filter are selectively separable from one another.

According to another aspect, the particulate filter includes a filtering screen that captures the particulate matter.

According to another aspect, the impeller and the filtering cap are positioned relative to the lower portion of the drum to submerge a top surface of the filtering cap in the wash fluid during performance of any wash cycle.

According to another aspect of the present disclosure, an impeller for a top-load washing appliance includes a plurality of external vanes that extend outward from a central receiver to an outer edge. A plurality of lowered portions are positioned in an alternating configuration between the plurality of external vanes. A plurality of channel ribs are disposed on an underside of the impeller and within the plurality of external vanes. A filtering cap is disposed within the central receiver. The filtering cap has a plurality of inlets that are configured to direct a toroidal flow of wash fluid into a filtering chamber that is positioned within the filtering cap. The filtering cap is selectively removable from the central receiver. A plurality of flow channels are defined, respectively, by an underside of the plurality of external vanes. The plurality of flow channels extend from the filtering chamber to the outer edge.

According to another aspect, the central receiver includes flow apertures that are defined within the central receiver. The flow apertures define a communication between the filtering chamber and the plurality of flow channels. The filtering cap at least partially engages the flow apertures of the central receiver.

According to another aspect, the filtering cap includes a cap portion and a particulate filter that have laterally-oriented apertures that are oriented generally perpendicular to the plurality of inlets.

According to another aspect, the cap portion and the particulate filter are selectively separable from one another. The particulate filter includes a filtering screen that captures particulate matter.

According to another aspect of the present disclosure, an impeller for a top-load washing appliance includes a plurality of external vanes that extend outward from a central receiver to an outer edge. A plurality of lowered portions are positioned in an alternating configuration between the plurality of external vanes. A plurality of channel ribs are disposed on an underside of the impeller and within the plurality of external vanes. A filtering cap is disposed within the central receiver. The filtering cap has a cap portion defining a plurality of inlets and a particulate filter that is selectively attached to the cap portion. A filter screen is attached to the particulate filter of the filtering cap. The plurality of inlets are configured to direct a toroidal flow of wash fluid into a filtering chamber that is positioned between the filtering cap and the central receiver. The filtering cap is selectively removable from the central receiver. A plurality of flow channels are defined, respectively, by an underside of the plurality of external vanes. The plurality of flow channels extend from the filtering chamber to the outer edge.

According to another aspect, the central receiver includes flow apertures that are defined within the central receiver. The flow apertures define a communication between the filtering chamber and the plurality of flow channels. The filtering cap at least partially engages the flow apertures of the central receiver.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A washing appliance comprising:
a tub that is positioned within an outer cabinet;
a drum that is rotationally operable within the tub about a vertical rotational axis; and
an impeller that is positioned within a lower portion of the drum and is rotationally operable relative to the drum about the vertical rotational axis, the impeller comprising:
a plurality of external vanes;
a plurality of structural ribs disposed on an underside of the impeller, wherein the plurality of external vanes and the plurality of structural ribs cooperate to promote a toroidal flow of wash fluid within the drum; and
a filtering cap disposed on a top portion of the impeller, the filtering cap having a cap portion that includes a plurality of inlets that direct the toroidal flow of the wash fluid into a filtering chamber that is positioned within the filtering cap, the toroidal flow of the wash fluid continuing through the filtering chamber and beneath the underside of the impeller, the filtering chamber configured to separate particulate matter from the toroidal flow of the wash fluid, wherein the filtering cap includes a particulate filter attached to the cap portion, the particulate filter having laterally-oriented apertures that are oriented generally perpendicular to the plurality of inlets.

2. The washing appliance of claim 1, wherein the filtering chamber is in communication with flow apertures that extend through the impeller and beneath the plurality of external vanes, respectively.

3. The washing appliance of claim 2, wherein the underside of the impeller beneath the plurality of external vanes defines respective flow paths that extend from the flow apertures and to an outer edge of the impeller, the flow paths at least partially defining the toroidal flow of the wash fluid during operation of the impeller during a wash cycle.

4. The washing appliance of claim 3, wherein the plurality of external vanes define a plurality of flow outlets that provide flow communication between the respective flow paths and a processing space of the drum above the impeller.

5. The washing appliance of claim 4, wherein the plurality of structural ribs are aligned with the flow paths and the plurality of external vanes that define the flow paths.

6. The washing appliance of claim 2, wherein the top of the impeller includes a receiver that receives the filtering cap, the filtering cap being selectively removable from the receiver.

7. The washing appliance of claim 6, wherein at least the receiver and the particulate filter cooperate to define the filtering chamber.

8. The washing appliance of claim 6, wherein the receiver includes a filter screen that extends over the flow apertures of the receiver to separate the particulate matter from the toroidal flow of the wash fluid.

9. The washing appliance of claim 6, wherein the filtering cap is selectively removable from the receiver to provide selective access to the filtering chamber.

10. The washing appliance of claim 6, wherein the impeller includes a plurality of lowered portions that are positioned in an alternating configuration between the plurality of external vanes, the lowered portions assisting in producing the toroidal flow.

11. The washing appliance of claim 6, wherein the particulate filter is attached to the filtering cap and the filtering cap is attached to the receiver.

12. The washing appliance of claim 6, wherein the filtering cap is attached to the receiver through a twist-lock mechanism.

13. The washing appliance of claim 12, wherein the particulate filter is attached to the filtering cap by one of a snapping engagement and a twist-lock engagement.

14. The washing appliance of claim 6, wherein the flow apertures are defined by the receiver of the impeller.

15. The washing appliance of claim 2, wherein a portion of the laterally-oriented apertures are aligned with the flow apertures of the impeller.

16. The washing appliance of claim 2, wherein the particulate filter includes a filter screen that extends across the laterally-oriented apertures.

17. The washing appliance of claim 1, wherein the plurality of inlets of the filtering cap includes at least one of slots and perforations that are defined within the cap portion of the filtering cap.

18. The washing appliance of claim 1, wherein the cap portion and the particulate filter are selectively separable from one another.

19. The washing appliance of claim 18, wherein the particulate filter includes a filtering screen that captures the particulate matter.

20. The washing appliance of claim 1, wherein the impeller and the filtering cap are positioned relative to the lower portion of the drum to submerge a top surface of the filtering cap in the wash fluid during performance of any wash cycle.

* * * * *